No. 12,668. REISSUED JULY 2, 1907.
J. BRENZINGER.
CAN HEADING MACHINE.
APPLICATION FILED FEB. 8, 1907.
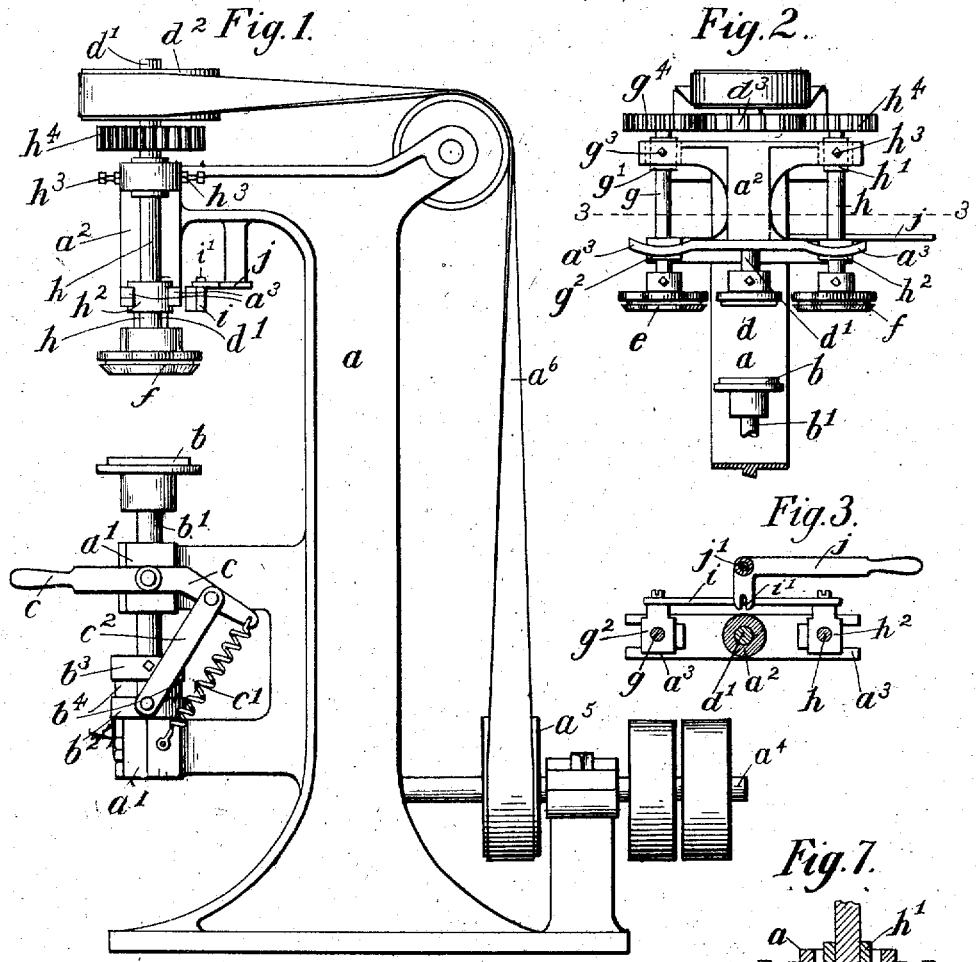
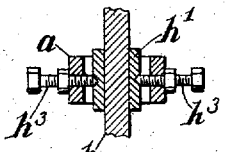
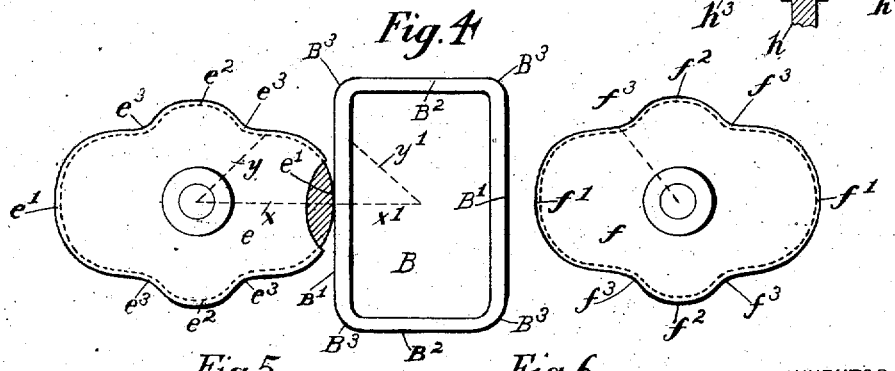
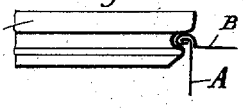
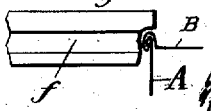
WITNESSES
James F. Duhamel
Frank Levy
INVENTOR
Julius Brenzinger
BY
Geo. H. Bowersock
ATTORNEY.

UNITED STATES PATENT OFFICE.

JULIUS BRENZINGER, OF MOUNT VERNON, NEW YORK, ASSIGNOR TO SANITARY CAN MACHINERY COMPANY, OF ELLSWORTH, MAINE, A CORPORATION OF MAINE.

CAN-HEADING MACHINE.

No. 12,668. Specification of Reissued Letters Patent. Reissued July 2, 1907.

Original No. 836,735, dated November 27, 1906. Application for reissue filed February 8, 1907. Serial No. 356,489.

*To all whom it may concern:*

Be it known that I, JULIUS BRENZINGER, a citizen of the United States, residing at Mount Vernon, in the county of Westchester and State of New York, have invented certain new and useful Improvements in Can-Heading Machines, of which the following is a specification.

This invention relates to can-heading machines, with particular reference to a machine for securing the head and body-portion, in the production of non-cylindrical forms of containers of this class, by what is known as double-seaming, which process comprises the interlocking and pressing together of overlapping edges of top and body portions. To effect this operation, one or more rollers may be employed which co-operate with a chuck to curl, roll or fold these overlapping edges together and compress the same into a bead which forms a tight and interlocked joint.

The operation of double-seaming a head to a cylindrical can-body has now come to be comparatively simple, it being apparent that in such process the point of co-operative action between the chuck and the seaming-roller is substantially fixed, where such operation is effected by members which rotate in substantially fixed bearings, or advances in a circular path of the same diameter as the can-body when the seaming-roller is revolved about a stationary chuck.

This process, however, as will be apparent, is not so simple when it comes to seaming a head upon a non-cylindrical can-body, inasmuch as the edges to be seamed are not circular and the point of co-operating contact between chuck and seaming-roller must continually change in position, if the chuck rotates, or advance in a deviating path if the seaming-roller revolves around a stationary chuck.

In the present invention I have particularly in mind a machine in which the chuck, which supports or forms an abutment for the top and body edges to be seamed, rotates in co-operative relation to a seaming-roller having, when the device is in operation, substantially fixed bearings, and the present invention may be said to consist, generally, in means for effecting such operation with non-cylindrical containers.

My invention will be more readily understood by reference to the accompanying drawings, forming a part of this specification, in which Figure 1 is a side elevation of a can-heading machine embodying my invention; Fig. 2 is a front elevation of the upper part thereof; Fig. 3 is a horizontal section substantially on the line 3—3 of Fig. 2; Fig. 4 is a plan view, partly in section, of the seaming-rollers and cover; Figs. 5 and 6 are details showing the operation of the first and second seaming-rollers, respectively, and Fig. 7 is a sectional detailed view hereinafter described.

Referring now to the drawings in detail, letter $a$ refers to the supporting frame of the machine, which is provided with bearings $a'$ to receive the shaft $b'$ of a rotatable platform $b$. This platform is adapted to support the can-body A to be headed, such can-body being of non-circular shape, the particular form of machine illustrated being designed to head cans of substantially rectangular shapes having the usual rounded corners.

The shaft $b'$, together with the platform $b$ may be raised and lowered by means of a lever $c$, preferably under the influence of a spring $c'$, and connected by a link $c^2$ with a collar $b^2$ loosely embracing the shaft $b'$. Between the collar $b^2$ and a collar $b^3$, fixed on the shaft $b'$, are interposed cushions $b^4$, whereby upon depression of the lever $c$ the shaft $b'$ is raised through the intervention of the link $c^2$, the collar $b^2$, the cushions $b^4$, and the collar $b^3$.

Vertically above the shaft $b'$ there depends from the frame $a$ a rotatable chuck $d$, adapted to snugly fit within the usual depression in the head or cover B which is to be joined to the can-body A. This depression in the head $b$, as is well known, corresponds in configuration to the cross-sectional configuration of the can-body, which, as has been explained, is non-circular and in this particular instance rectangular with rounded corners. The chuck $d$, therefore, is of non-circular peripheral configuration. The spindle $d'$ of the chuck $d$ is mounted in bearings $a^2$ and is rotated by means of a power-shaft $a^4$ driving the pulley $a^5$, the belt $a^6$ transmitting the power to the pulley $d^2$ on the spindle $d'$.

It will be apparent that when the can-body A, with the head or top B in position, is placed upon the platform $b$ and the latter is raised until the head or top B is engaged by the chuck $d$, the parts A and B will be rotated in unison.

During the rotation of parts A and B, their superposed flanged edges, suitably supported by the chuck $d$, are upset by a pair of seaming-rollers $e$ and $f$, of which roller $e$ is profiled to form a double seam, as shown in Fig. 5, while roller $f$ is profiled to flatten such seam, as shown in Fig. 6.

While in connection with this machine I have shown and ordinarily prefer to employ two seaming rollers, it will be apparent that the seaming process may be performed, although possibly not so satisfactorily, by means of one roller only, each of these rollers being provided with a peripheral groove which in the forming-roller $e$, if two rollers are employed, is somewhat deeper than that in the roller $f$.

It will be apparent that in rotating the supported edges of body and head, to effect the seaming operation through the medium of one or more rollers in continuous co-operative relation to said supporting means, it will be necessary in case the bearings of such roller or rollers are fixed during the seaming operation, to give the peripheral edge of said roller a configuration which will continuously conform to the deviations from the circular of the peripheral movement of the chuck $d$. In other words, the contour of the roller $e$ (a further description of which will suffice as well for the roller $f$, which in all save the depth of the peripheral groove is identical thereto) may be said to be complementary to that of the chuck $d$, and therefore of the can-body; so that as the parts $e$ and $d$ are jointly rotated, the sum of their successively alined radii is always the same. Thus, referring to Fig. 4, the sum of the radii $x$ and $x'$ is equal to the sum of the radii $y$ and $y'$, or of any other two radii which will become alined during rotation of these parts. For a can-head of substantially the configuration shown in Fig. 4, therefore, the roller $e$ must be similarly elongated, having two diametrically-arranged larger convex cam-sections $e'$ and two intermediate diametrically-arranged smaller convex cam-sections $e^2$. Between each pair of sections $e'$ and $e^2$, there is formed the reëntrant curve or concave cam-section $e^3$. With this construction the peripheral length of each cam-section $e'$ corresponds substantially to the length of each longer side B′ of the head B, cam-section $e^2$ corresponds substantially to the shorter side $B^2$ of said head, and the reëntrant curves $e^3$ correspond substantially to the length of the curve at the rounded corners $B^3$ of said head.

It is obvious that with a can of different shape, the contour of the roller $e$ must be correspondingly changed, the relative construction being that the grooved working-edge of the roller is complementary to the peripheral configuration of the can.

In the form of machine illustrated each of the rollers $e$ and $f$ is designed to be rotated at the same velocity as the chuck $d$ carrying the can, and its periphery is equal in length to that of the seam to be upset thereby; therefore, the peripheral length and working-edge velocity of the chuck $d$ substantially corresponds to the peripheral length and working-edge velocity of each of the rollers $e$ and $f$, the roller $f$ having the cam-sections $f'$ and $f^2$ and the reëntrant sections $f^3$ corresponding to the similar sections in roller $e$.

Where two rollers are employed it is, of course, desirable that they be brought into operation successively, and I therefore provide upper bearings $g'$ and $h'$, for the shafts $g$ and $h$ upon which the rollers $e$ and $f$ are mounted, which are freely suspended between screws $g^3$ and $h^3$, respectively. This construction of the shaft $h$ is shown in detail in Fig. 7, and the construction is identical for the shaft $g$. The lower bearings are slidable in curved slotted guides $a^3$, projecting laterally from the bearing $a^2$. The bearings $g^2$ and $h^2$ are connected by a slide $i$, having a pin $i'$ which is grasped by the notched end of a bent or bell-crank lever $j$, fulcrumed to frame $a$ at $j'$. Thus, by manipulating lever $j$, either of the bearings $g^2$ or $h^2$ may be moved inwardly to correspondingly tilt its shaft $g$ or $h$ and thereby move its roller $e$ or $f$ laterally into operative relation to the chuck $d$, the other roller being carried out of such relation.

Simultaneous rotary movement is imparted to the rollers $e$ and $f$ by gear-wheels $g^4$ and $h^4$, fast on the shafts $g$ and $h$, respectively, and meshing with a gear-wheel $d^3$ fast on the shaft $d'$. The gear-wheels $g^4$ and $h^4$ are of the same diameter as gear $d^3$, so that the rollers $e$ and $f$ rotate with the same speed as the chuck $d$, the teeth of the wheels $g^4$ and $h^4$ being so shaped as to permit the slight oscillation of the shafts $g$ and $h$ on the screws $g^3$ and $h^3$.

It will be seen that by the construction described the working seaming-roller, while in operative engagement with the can, will turn on a stationary axial line and the operative contact between can and roller will be maintained.

Many modifications other than those suggested of minor details of my improved can-heading machine will doubtless readily suggest themselves to those skilled in the art to which it appertains, and I therefore do not desire to limit my invention to the specific construction herein shown and described.

Having thus described my invention, I claim as new and desire to secure by Letters Patent:

1. In a can-heading machine, the combination of means for rotating a non-circular chuck in continuously co-operative relation to a rotating seaming-roller having the same peripheral velocity, both of said elements when in operation having substantially fixed bearings.

2. In a can-heading machine, the combination of means for rotating a non-circular chuck in continuous co-operative relation to a non-circular seaming-roller of lineally equal periphery.

3. In a can-heading machine, the combination of means for rotating a non-circular chuck in continuously co-operative relation to a rotating seaming-roller having a lineally equal periphery and the same peripheral velocity.

4. In a can-heading machine, the combination of means for rotating a non-circular chuck in continuous co-operative relation to a non-circular seaming-roller positively rotated at the same peripheral velocity.

5. In a can-heading machine, the combination of means for rotating a non-circular chuck in continuous co-operative relation to a complementally non-circular seaming roller of lineally equal periphery.

6. In a can-heading machine, the combination of means for rotating a non-circular chuck in continuous co-operative relation to a complementally non-circular seaming-roller having the same peripheral velocity.

7. In a can-heading machine, the combination of means for rotating a non-circular chuck in continuously co-operative relation to a positively-driven, non-circular seaming-roller of lineally equal-working periphery, both of said elements having substantially fixed axes of rotation when in operation.

8. In a can-heading machine, the combination of a chuck having a non-circular working periphery, a seaming-roller, both of said elements having substantially fixed axes of rotation when in operation and lineally equal peripheries, and means for positively driving both in opposite directions of rotation and in continuously co-operative relation.

9. In a can-heading machine, the combination of a chuck having a non-circular working periphery, a seaming-roller, both of said elements having substantially fixed axes of rotation when in operation, and means for positively driving both in continuous co-operative relation and at the same peripheral velocities.

10. In a can-heading machine, the combination of a non-circular chuck, a complementally non-circular seaming-roller, and means for positively driving both of said elements at the same peripheral velocity, said elements having substantially fixed axes of rotation when in operation whereby the sum of their successively alined radii remains constant.

11. In a can-heading machine, the combination, with a chuck having a non-circular working periphery, of a seaming-roller having a complementally inwardly and outwardly curved working periphery of the same length, whereby when rotated said members will remain in continuous co-operative relation, and means for rotating said members.

12. In a can-heading machine, the combination, with a rotating chuck having a working periphery of substantially rectilinear configuration with rounded corners, of a seaming roller having fixed bearings when in operation and a working periphery alternately inwardly and outwardly curved and complemental to said chuck periphery, whereby when rotated said members will remain in continuous co-operative relation, and means for rotating said members.

13. In a can-heading machine, the combination, with a rotating chuck having a working periphery in the form of a rectangle with corners rounded, of a seaming roller having fixed bearings when in operation and a working periphery of equal length alternately inwardly and outwardly curved and complemental to said chuck periphery, whereby when rotated said members will remain in continuous co-operative relation, and means for positively rotating said members at the same velocity.

14. In a can-heading machine, the combination of means for rotating a non-circular chuck successively in continuous co-operative relation to each of two seaming rollers, said elements when in effective co-operative relation having substantially fixed axes of rotation.

15. In a can-heading machine, the combination of means for rotating a non-circular chuck selectively in continuous co-operative relation to each of two complementally non-circular seaming rollers, said elements when in effective co-operative relation having substantially fixed axes of rotation.

16. In a can-heading machine, the combination, with a chuck having a non-circular working periphery, of two seaming rollers, means for selectively rotating said chuck in continuously co-operative relation to one or the other of said rollers, both chuck and roller when in effective co-operative relation having substantially fixed axes of rotation, and common means for positively rotating all of said members.

17. In a can-heading machine, the combination, with a chuck having a non-circular working periphery, of two complementally non-circular seaming rollers, means for selectively rotating said chuck in continuously co-operative relation to one or the other of said rollers, both chuck and roller being of equal peripheral lengths and when in effective co-operative relation having substantially fixed axes of rotation, and common means for positively rotating all of said members at the same velocity.

18. In a can-heading machine, the combination, with a chuck having a periphery of substantially rectilinear configuration with rounded corners, of two seaming rollers each having a complementally inwardly and outwardly curved working periphery of the same length as that of said chuck, means for selectively rotating said chuck in continuously co-operative relation to one or the other of said rollers, both chuck and roller when in effective co-operative relation having substantially fixed axes of rotation, and common means for positively rotating all of said members.

In testimony whereof, I have hereunto set my hand, in the presence of two witnesses.

JULIUS BRENZINGER.

Witnesses:
FRED H. BOWERSOCK,
WALTER J. MCCANN.